(12) United States Patent
Halbweiss et al.

(10) Patent No.: US 6,764,128 B2
(45) Date of Patent: Jul. 20, 2004

(54) HARDTOP VEHICLE ROOF WITH THREE RIGID ROOF PARTS

(75) Inventors: Thomas Halbweiss, Remseck (DE); Andreas Hasselgruber, Eberdingen-Nussdorf (DE); Jens Merte, Netphen (DE); Thobias Wagner, Hamburg (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/619,288

(22) Filed: Jul. 15, 2003

(65) Prior Publication Data

US 2004/0012224 A1 Jan. 22, 2004

Related U.S. Application Data

(63) Continuation-in-part of application No. PCT/EP02/11209, filed on Oct. 7, 2002.

(30) Foreign Application Priority Data

Oct. 19, 2001 (DE) .......................................... 101 51 170

(51) Int. Cl.[7] .................................................. B60J 7/08
(52) U.S. Cl. .................................. 296/108; 296/107.17
(58) Field of Search ........................... 296/108, 107.17, 296/116, 107.16

(56) References Cited

U.S. PATENT DOCUMENTS 6,336,673 B1 * 1/2002 Rothe et al. ........... 296/107.17

2001/0004156 A1 6/2001 Neubrand et al.

FOREIGN PATENT DOCUMENTS

| DE | 196 42 152 | 4/1998 |
| DE | 0 835 779 | 5/1998 |
| DE | 198 47 983 | 5/2000 |
| DE | 199 13 033 | 10/2000 |

* cited by examiner

Primary Examiner—Joseph D. Pape
(74) Attorney, Agent, or Firm—Klaus J. Bach

(57) ABSTRACT

In a hardtop vehicle roof comprising a front, an intermediate and a rear roof part supported on a vehicle body so as to be movable between a closed position, in which the roof parts cover an interior vehicle space, and an open position, in which the roof parts are deposited in a storage compartment behind the interior vehicle space, wherein the rear roof part is pivotally supported on the vehicle body, the front roof part is movable under the intermediate roof part in parallel relationship therewith and the intermediate roof part is supported so as to be movable together with the front roof part into the storage compartment onto the rear roof part already pivoted into the storage compartment so as to form in the storage compartment a roof part packet with the rear roof part disposed at the bottom with its outer surface facing downwardly and the intermediate roof part disposed on top of the packet and the front roof parts is disposed between the rear and intermediate roof parts with the top surfaces of both the front and intermediate roof parts facing upwardly.

9 Claims, 1 Drawing Sheet

HARDTOP VEHICLE ROOF WITH THREE RIGID ROOF PARTS

This is a Continuation-In-Part application of international application PCT/EP02/11209 filed Oct. 7, 2002 and claiming the priority of German application 101 51 170.1 filed Oct. 19, 2001.

BACKGROUND OF THE INVENTION

The invention resides in a hardtop vehicle roof with rigid front, intermediate and rear roof parts, which are movable between a closed position, in which the roof parts cover an interior space of a vehicle, and a storage position, in which the roof parts are deposited in a rear storage compartment. The rear roof part is pivotally connected to the vehicle body and, in the storage position, the three roof parts are deposited in the storage compartment stacked on top of one another as a roof packet with the rear roof part disposed at the bottom, the intermediate roof part disposed on top and the front roof part disposed between the rear and intermediate roof parts.

A vehicle roof including front intermediate and rear roof parts is disclosed in EP 0 835 779 A1. The roof parts are movable between a closed position, in which they cover an interior vehicle space, and a storage position, in which the roof parts are deposited in a rear storage space. The three roof parts form a kinematic chain, wherein the rear roof part is pivotally connected to the vehicle body, the intermediate roof part is pivotally connected to the rear roof part and the front roof part is pivotally connected to the intermediate roof part. In the closed position, the three roof parts are disposed in the longitudinal vehicle direction one behind the other so as to jointly form the vehicle roof. In the storage position, the roof parts are folded into a packet, in which the rear roof part is disposed at the bottom, the intermediate roof part is disposed on top and the front roof part is disposed between the rear and intermediate roof parts. For the transfer from the closed to the storage position, the front and rear roof parts are pivoted about their pivot axes in a direction opposite to the direction in which the rear roof part pivots about its pivot axis.

As a result, in the storage position, the front and the intermediate roof part are deposited oppositely oriented in the storage compartment so that the packet formed by the roof parts is relatively high and space-consuming since their outwardly curved areas extend in opposite directions. As a result, the trunk space available for the storage of luggage is quite limited.

It is the object of the present invention to provide a hardtop vehicle roof including three roof parts, which occupy only a relatively small storage volume in their storage position.

SUMMARY OF THE INVENTION

In a hardtop vehicle roof comprising a front, an intermediate and a rear roof part supported on a vehicle body so as to be movable between a closed position, in which the roof parts cover an interior vehicle space, and an open position, in which the roof parts are deposited in a storage compartment behind the interior vehicle space, wherein the rear roof part is pivotally supported on the vehicle body, the front roof part is movable under the intermediate roof part in parallel relationship therewith and the intermediate roof part is supported so as to be movable together with the front roof part into the storage compartment onto the rear roof part already pivoted into the storage compartment so as to form in the storage compartment a roof part packet with the rear roof part disposed at the bottom with its outer surface facing downwardly and the intermediate roof part disposed on top of the packet and the front roof parts is disposed between the rear and intermediate roof parts with the top surfaces of both the front and intermediate roof parts facing upwardly.

During the transfer of the vehicle roof between the closed and the storage positions, the relative movements of the roof parts with respect to adjacent roof parts are pivot movements and lowering and displacement movements for moving one roof part below the respective adjacent roof part. The rear roof part adjacent the rear part of the vehicle is pivotally connected to the vehicle body. It is simply pivoted into the storage compartment or out of the storage compartment. The front roof part is moved during the transfer into the storage compartment below the intermediate roof part. The front and intermediate roof parts form a partial roof part packet and are deposited in the storage compartment in the same orientation as they are in the closed position, that is, with the outer roof surface facing upwardly. The rear roof part is pivoted out of its closed position to such an extent, that, in the storage position, the outer surface of the rear roof part faces downwardly toward the storage compartment floor.

Since the front and the intermediate roof parts are deposited in the storage compartment on top of one another in parallel and in the same orientation, a compact packet volume is obtained. The pivotal support of the rear roof part on the vehicle body is accomplished kinematically in a simple, inexpensive and reliable manner.

It is advantageous if the front roof part is supported on the intermediate roof part by an operating mechanism, which permits the lowering of the front roof part into a parallel position below the intermediate roof part. This is possible in a particularly simple arrangement by a four-link kinematic link mechanism. Furthermore, it may be advantageous if the intermediate roof part is pivotally connected to the rear roof part. This also represents a connection of simple design.

A particularly compact storage volume can be achieved if a rear window panel, which is arranged in the rear roof part between two C-columns is removed and deposited in the storage compartment independently of the C-columns. In this case, the rear window panel may be deposited in the storage compartment in an upright, that is, in an essentially vertical, orientation. The C-columns—if present—together with upper and lower transverse frame members extending between the C-columns are pivoted into the storage compartment whereby the area between the C-columns is open and the intermediate and front roof parts can be partially accommodated in that open space. The rear window panel is disposed in the storage compartment expediently between the roof packet and the interior vehicle space or, respectively, in a recess provided for the reception of the rear window panel in that area.

The storage compartment is closed by a storage compartment lid, which is movably supported by a trunk lid of the vehicle. For the transfer of the vehicle roof parts into the storage compartment, the storage compartment lid is preferably moved into a position below the trunk lid, whereby sufficient space is provided for accommodating the operating mechanism for the vehicle roof or the support structure supporting it on the vehicle body when the vehicle roof is closed and also sufficient space for the transfer of the vehicle roof between the closed and the storage positions. When the vehicle roof is deposited in the storage compartment, the storage compartment lid can be moved into its cover position in which the storage compartment lid and the trunk lid are disposed in a common lid plane.

For the transfer of the vehicle roof between its closed and storage positions and also for the loading and unloading of the trunk of the vehicle, the trunk lid is raised by lifting its rear end adjacent the rear loading edge of the vehicle.

In combination with the movement of the storage compartment lid below the trunk lid, sufficient space is then provided for the transfer movement of the roof parts.

Further advantages and expedient embodiments of the invention will be described below on the basis of the accompanying drawings.

DESCRIPTION OF A PREFERRED EMBODIMENT OF THE INVENTION

Figure 1:
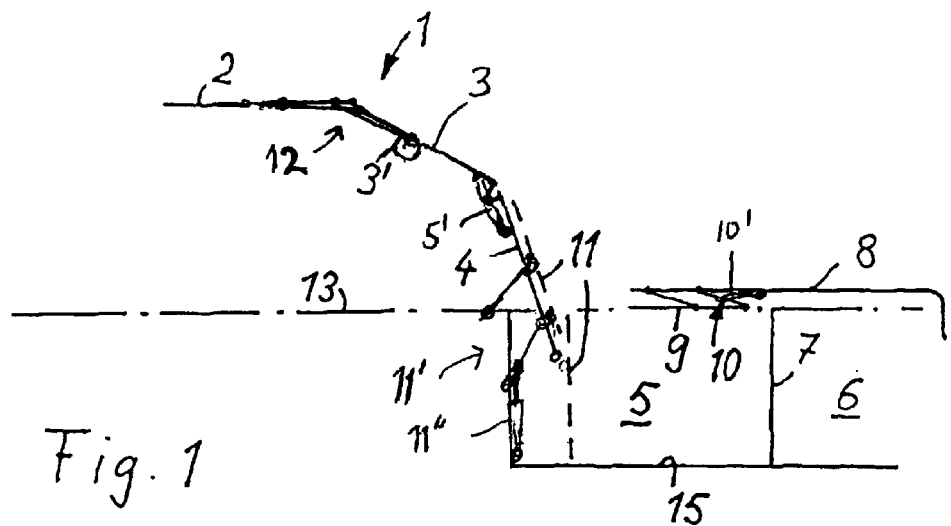
FIG. 1 shows schematically, in a side view, a three-part hardtop vehicle roof in a closed position.

In the figures identical components are designated by the same reference numerals.

Figure 3:
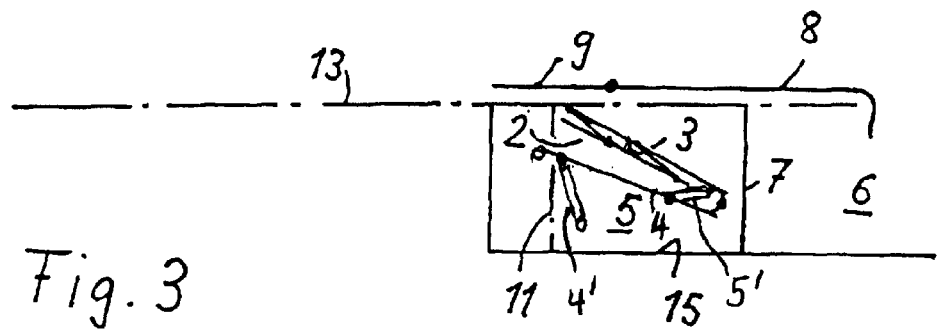
FIG. 3 shows the hardtop vehicle roof in a storage position, in which the roof parts are deposited in a rear storage compartment of the vehicle.

The vehicle roof 1 shown in FIG. 1 in a closed position is a three-part hardtop roof including a front roof part 2, an intermediate roof part 3 and a rear roof part 4. All three roof parts 2, 3 and 4 are rigid shells. The hardtop vehicle roof 1 is movable between the closed position as shown in FIG. 1, in which the vehicle roof covers an interior vehicle space, and a storage position as shown in FIG. 3, in which the vehicle roof is deposited in a storage compartment 5. The storage compartment 5 is separated from the trunk 6 disposed behind the storage compartment 5 by a dividing wall 7. However, the dividing wall may be omitted so that the storage compartment 5 and the trunk 6 form a common rear storage trunk when the roof is closed.

Figure 2:
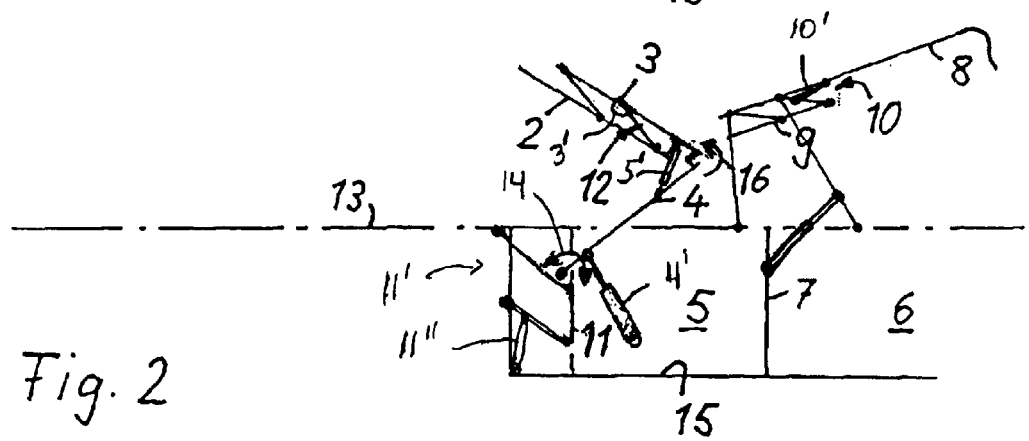
FIG. 2 shows the vehicle roof parts in an intermediate position between the closed position and a storage position.

Further, there is provided a trunk lid 8, which, when closed, covers the trunk 6. On the trunk lid 8, a storage compartment lid 9 is movably supported by a lid movement mechanism 10. The storage compartment lid 9 is movable between an open parallel position below the trunk lid 8 as shown in FIGS. 1 and 2 and a closed position as shown in FIG. 3, in which the trunk lid 8 and the storage compartment lid 9 are disposed in a common lid plane and the storage compartment 5 is completely covered. The storage compartment lid movement mechanism 10 is for example a four-link kinematic mechanism operable by a cylinder-piston assembly 10'.

The rear roof part 4 is pivotally connected to the vehicle body which is indicated in the figures by a dash-dotted line 13, which represents also the top of the lower vehicle body. During the transfer between the closed and the storage positions, the rear roof part 4 is pivoted by an operating cylinder-piston assembly 4' in a direction as indicated in FIG. 2 by the arrow 14, until the storage position as indicated in FIG. 3 is reached, in which the outer surface of the rear roof part 4 faces the bottom 15 of the storage compartment 5, also for example by a cylinder-piston assembly 5'. In this position, the outer surface of the rear roof part 4 extends essentially parallel to the bottom 15 of the storage compartment 5. The intermediate roof part 3 is pivotally connected to the rear roof part 4, and, during the transfer movement into the storage compartment 5, is pivoted as indicated in FIG. 2, in the direction of the arrow 16 relative to the rear roof part 4. This pivot movement is in the opposite direction of that of the rear roof part 4, which is indicated by arrow 14.

The front roof part 2 is connected to the intermediate roof part 3 by a support or operating mechanism 12. The operating mechanism 12 provides for lowering and displacement of the front roof part 2 relative to the intermediate roof part 3 into a position parallel to, and below, the intermediate roof part 3. The drive for the operating mechanism 12 is indicated as an electric pivot motor but a hydraulic cylinder-piston assembly could also be employed as shown for the other drives. The final relative position of the front roof part 2 below the intermediate roof part 3 is reached in the storage compartment as shown in FIG. 3. In the storage compartment 5 both roof parts 2 and 3 are stacked on top of one another with their outer surfaces facing upwardly away from the bottom 15 of the storage compartment 5. In the storage position, as shown in FIG. 3, all three roof parts 2, 3, 4 form a roof part packet and are stored essentially in parallel relationship. The rear roof part 4 is disposed at the bottom, the intermediate roof part 3 is disposed on top and the front roof part 2 is disposed in the middle between the rear and the intermediate roof parts 4 and 3. The operating mechanism 12 is for example a four-link kinematic operating mechanism but other operating or transfer mechanism such as a slide arrangement may be used.

The rear roof part 4 includes a rear window panel 11, which is supported between two side C-columns of the rear roof 4. Expediently, the rear window panel 11 is provided with a separate operating mechanism 11' including a cylinder-piston drive 11", which permits lowering of the rear window panel 11 out of the rear roof part 4 independently of the roof operating mechanism. The rear window panel can be lowered into the storage compartment 5 so as to be disposed therein essentially vertically. When the vehicle roof is in the storage compartment 5, the rear window panel is then disposed in the storage compartment 5 between the roof part packet and the vehicle interior. The removal of the rear window panel 11 from the rear roof part 4 permits a compact arrangement of the roof parts in the storage compartment since the space between the side C-columns can be utilized in the storage position for accommodating the intermediate and, respectively, front roof parts 3 and 2.

During the transfer of the vehicle roof 1 from the closed position to the storage position, first the rear window panel 11 is lowered into the storage compartment. While the rear window panel 11 is lowered, the C-columns remain in the closed position. Then the trunk lid 8 is raised together with the storage compartment lid 9 which has been moved below the trunk lid 8 in order to provide a passage for the transfer of the vehicle roof parts. For raising of the trunk lid 8, the trunk lid is pivoted and at the same time moved upwardly so that expediently also the front edge of the trunk lid is moved upwardly, although by a smaller amount than the rear end of the trunk lid 8. While the trunk lid 8 is being raised, the movement of the roof parts into the storage compartment is initiated.

What is claimed is:

1. A hardtop vehicle roof comprising a front an intermediate and a rear roof part supported on a vehicle body so as to be movable between a closed position, in which the roof parts cover an interior vehicle space, and an open position, in which the roof parts are deposited in a storage compartment behind the interior vehicle space, said rear roof part being pivotally supported on said vehicle body, said front roof part being movable under said intermediate roof part in parallel relationship therewith and said intermediate roof part being supported, so as to be movable, together with the front roof part disposed below the intermediate roof part, onto the rear roof part pivoted into the storage compartment thereby forming in the storage compartment a roof part packet with the rear roof part disposed on the bottom in an orientation in which the outer surface of the rear roof part faces downwardly, and the intermediate roof part disposed on top of the packet and the front roof part disposed between the rear and intermediate roof parts with the top surfaces of both the intermediate and front roof parts facing upwardly.

2. A hardtop vehicle roof according to claim 1, wherein the front roof part is connected to the intermediate roof part by way of a kinematic operating mechanism.

3. A hardtop vehicle roof according to claim 1, wherein the intermediate roof part is pivotally connected to the rear roof part.

4. A hardtop vehicle roof according to claim 1, wherein the rear roof part includes side C-columns with a rear window panel disposed therebetween, said rear window panel being independently movable out of its location between the C-columns by an operating mechanism into the storage compartment in a vertical storage position.

5. A hardtop vehicle roof according to claim 4, wherein in the storage compartment, the rear window panel is disposed just behind the interior vehicle space and in front of the roof part packet.

6. A hardtop vehicle roof according to claim 1, wherein a storage compartment lid for covering the storage compartment is movably supported on a trunk lid.

7. A hardtop vehicle roof according to claim 6, wherein, in the closed position of the vehicle roof and for the transfer of the roof parts between the closed and the storage position the storage compartment lid is disposed below the trunk lid.

8. A hardtop vehicle roof according to claim 7, wherein the storage compartment lid is supported on the trunk lid by a four-link mechanism.

9. A hardtop vehicle roof according to claim 1, wherein the trunk lid is supported for opening in the same way for the transfer of the vehicle roof between the closed and the storage positions and for loading and unloading the trunk.

* * * * *